United States Patent [19]

Hann et al.

[11] Patent Number: 5,658,464
[45] Date of Patent: Aug. 19, 1997

[54] METHOD OF INHIBITING SULFATE SCALE IN AQUEOUS SYSTEMS USING POLY (AMINO ACIDS)

[75] Inventors: William Mathis Hann, Gwynedd, Pa.; Yi Hyon Paik, Princeton, N.J.; Susan Tabb Robertson, Ambler; Graham Swift, Blue Bell, both of Pa.

[73] Assignee: Rohm and Haas Company, Philadelphia, Pa.

[21] Appl. No.: 706,142

[22] Filed: Sep. 20, 1996

Related U.S. Application Data

[63] Continuation of Ser. No. 304,056, Sep. 12, 1994, abandoned.
[51] Int. Cl.$^6$ .................................................. C02F 5/14
[52] U.S. Cl. ........................... 210/697; 210/698; 210/699; 252/180; 252/181
[58] Field of Search .................................. 210/697–701; 252/180, 181

[56] References Cited

U.S. PATENT DOCUMENTS

| | | | |
|---|---|---|---|
| 3,846,380 | 11/1974 | Fujimoto et al. | 260/784 |
| 4,534,881 | 8/1985 | Sikes et al. | 210/698 |
| 4,575,425 | 3/1986 | Boffardi et al. | 210/697 |
| 4,587,021 | 5/1986 | Wheeler et al. | 210/698 |
| 4,590,260 | 5/1986 | Harada et al. | 528/328 |
| 4,603,006 | 7/1986 | Sikes et al. | 252/180 |
| 4,804,476 | 2/1989 | Sinkovitz et al. | 210/697 |
| 4,839,461 | 6/1989 | Boehmke | 528/363 |
| 4,868,287 | 9/1989 | Sikes et al. | 530/324 |
| 4,980,433 | 12/1990 | Chen et al. | 526/240 |
| 5,051,401 | 9/1991 | Sikes | 514/7 |
| 5,057,597 | 10/1991 | Koskan | 528/328 |
| 5,116,513 | 5/1992 | Koskan et al. | 210/698 |
| 5,152,902 | 10/1992 | Koskan et al. | 210/698 |
| 5,204,099 | 4/1993 | Barbier et al. | 424/401 |
| 5,260,272 | 11/1993 | Donachy et al. | 524/12 |
| 5,284,512 | 2/1994 | Koskan et al. | 106/416 |
| 5,302,293 | 4/1994 | Kaplan et al. | 210/701 |
| 5,306,429 | 4/1994 | Wood et al. | 210/698 |
| 5,328,690 | 7/1994 | Sikes | 424/401 |
| 5,332,505 | 7/1994 | Carey et al. | 210/697 |
| 5,408,028 | 4/1995 | Wood et al. | 528/328 |
| 5,457,176 | 10/1995 | Adler et al. | 528/328 |
| 5,506,335 | 4/1996 | Uhr et al. | 528/322 |
| 5,523,023 | 6/1996 | Kleinstuck et al. | 252/542 |
| 5,525,257 | 6/1996 | Kleinstuck et al. | 252/181 |
| 5,531,934 | 7/1996 | Freeman et al. | 252/390 |

FOREIGN PATENT DOCUMENTS 692459  1/1996  European Pat. Off. .

OTHER PUBLICATIONS

S. Sarig, et al., "The Use of Polymers for Retardation of Scale Formation", National Council for Research and Development, 150–157 (1977).

S. Sarig, et al., "Selection of Threshold Agents for Calcium Sulfate Scale Control on the Basis of Chemical Structure", Desalination 17(2):215–229 (1975).

Inhibition Of Barium Sulfate Precipitation: Effects Of Additives, Solution pH, And Supersaturation, Water Treatment, 9 (1994) 47–56, Zahid Amjad, The BF Goodrich Company, Specialties Polymer and Chemicals Division, Brecksville, OH, U.S.

*Primary Examiner*—Peter A. Hruskoci
*Attorney, Agent, or Firm*—Kimberly R. Hild

[57] ABSTRACT

The present invention provides a method for inhibiting the formation of metal sulfate scale in an aqueous system. Metal sulfate scale formation is inhibited by adding an effective amount of one or more poly(amino acids) and one or more inorganic phosphates to the aqueous system. The poly (amino acids) are a reaction product formed from at least one compound selected from amino acids, amic acids, ammonium salts of monoethylenically unsaturated dicarboxylic acids, and ammonium salts of hydroxypolycarboxylic acids. The present invention also provides a method of inhibiting the formation of metal sulfate scale by adding an effective amount of a poly(amino acid) which contains tyrosine, tryptophan, histidine, arginine or combinations thereof.

14 Claims, No Drawings

METHOD OF INHIBITING SULFATE SCALE IN AQUEOUS SYSTEMS USING POLY (AMINO ACIDS)

This application is a continuation of application Ser. No. 08/304,056, filed Sep. 12, 1994, now abandoned.

BACKGROUND

The present invention relates to a method of inhibiting metal sulfate scale formation in an aqueous system. More particularly, the invention is directed to the use of certain poly(amino acids) to inhibit scale formation of metal sulfates. The poly(amino acids) are preferably added with at least one inorganic phosphate to the aqueous system.

Metal sulfate scale formation is a common problem in many aqueous systems. The sulfate scale is formed in the aqueous systems, when cations, for example alkaline earth metal ions, combine with sulfate ions. Metal sulfate scale includes for example magnesium sulfate, calcium sulfate, barium sulfate, strontium sulfate, radium sulfate, iron sulfate, and manganese sulfate.

Aqueous systems where metal sulfate scale may form are for example in cooling water systems, boilers, heat exchange equipment, reverse osmosis equipment, sugar processing equipment, geothermal systems, oil and gas production operations, flash evaporators, desalination plants, paper making equipment, and steam power plants. Metal sulfate scale is particularly found in paper making equipment, desalination plants, reverse osmosis, and oil and gas production operations.

The metal sulfate scale forms on the surfaces of the aqueous systems causing such problems for example as reduced heat transfer, plugged pipes, and acceleration of corrosion. Once formed, the sulfate scale is difficult to remove. Scraping, sand blasting, chipping, or chemical removal with specially formulated cleaners may be required to remove the scale.

To prevent the formation of metal sulfate scale, scale inhibitors are added to aqueous systems.

For example, in papermaking processes, scale inhibitors are added to prevent excessive scale build-up in the equipment, such as in the headbox and related piping, and on the fourdrinier wire. The metal sulfate scale is formed from the interaction of the alkaline earth metals and sulfate ions found in components used in the paper making process. For example, barium and other alkaline earth metals are found in wood pulp, which is a primary ingredient in the paper making process. Sources of sulfate ions in the paper making process are, for example, from water or aluminum sulfate which may be intentionally added to increase retention of other additives during formation of paper.

Scale inhibitors are used in equipment to purify sea water or brackish water in desalination plants. Such equipment includes for example reverse osmosis equipment and distillation units. Because sea water or brackish water contains both sulfate ions and alkaline earth metals, as the water is purified, the metal sulfate concentrates and deposits on the equipment surfaces to form scale. The scale formation can be a serious problem causing the equipment to operate less efficiently leading to equipment downtimes for cleaning and increased operating costs.

In oil production operations, the formation of metal sulfate scale is a common and serious problem. Consequently scale inhibitors are commonly used. The metal sulfate scale, most commonly barium sulfate and calcium sulfate, typically form when alkaline earth metal ions from an aquifer or from connate water, combine with water containing sulfate ions, such as sea water or another aquifer previously unconnected to the first aquifer. The metal sulfate deposits as scale in subterranean formations or in topside equipment such as in pipes, valves, and pumps.

Scale inhibitors are used in various ways to prevent scale formation in oil production operations. For example, in what is called a "squeeze treatment", an aqueous solution, containing scale inhibitor, is forced under pressure through the wells into the subterranean formation. The scale inhibitors are believed to adsorb or precipitate onto the formation and gradually desorb or resolubilize from the formation to inhibit scale from depositing and prevent clogging of the formation with scale. The well is then periodically resqueezed when the concentration of scale inhibitor falls below an effective concentration for scale inhibition.

Scale inhibitors may also be fed into pipelines to prevent scale formation, which would impede the transport of oil. Additionally, scale inhibitors are used in secondary oil recovery operations, where pressurized water is used to recover additional oil.

Scale inhibitors which have been used in aqueous systems to inhibit metal sulfate scale formation are for example homopolymers and copolymers of acrylic acid. More recently, there has been a trend to develop scale inhibitors which have greater biodegradability. For example, U.S. Pat. No. 5,116,513 to Koskan, et al., discloses the use of a poly(amino acid), poly(aspartic acid), having a molecular weight of 1000 to 5000 as a scale inhibitor for calcium sulfate and barium sulfate. The poly(aspartic acid) is produced by the thermal condensation of aspartic acid to form polysuccinimide. The polysuccinimide is then hydrolyzed to form poly(aspartic acid) which preferably is greater than 50 percent in β-form and less than 50 percent in α-form. The poly(aspartic acid) is disclosed to be biodegradable.

The problem addressed by the present invention is to provide additives which improve the performance of poly (amino acids) to inhibit metal sulfate scale formation. The present invention also seeks to provide certain poly(amino acids) which more effectively inhibit metal sulfate scale formation.

We have found that adding one or more inorganic phosphates and one or more poly(amino acids) to an aqueous system to inhibit metal sulfate scale formation, is more effective than what would be expected by adding either the phosphates or poly(amino acids) alone to the aqueous system.

STATEMENT OF THE INVENTION

We have discovered a method of inhibiting scale formation, comprising: adding to an aqueous system an effective amount of one or more poly(amino acids) and one or more inorganic phosphates; wherein the poly(amino acids) comprise a reaction product of at least one compound selected from the group consisting of: amino acids, amic acids, ammonium salts of monoethylenically unsaturated dicarboxylic acids, and ammonium salts of hydroxypolycarboxylic acids; and wherein the scale is metal sulfate scale.

In another embodiment of the present invention, we have discovered a method of inhibiting scale formation, comprising: adding to an aqueous system an effective amount of one or more poly(amino acids), wherein the poly(amino acids) comprise a reaction product of at least one first compound selected from the group consisting of histidine, arginine, tyrosine, tryptophan, and combinations thereof; and wherein the scale is metal sulfate scale.

DETAILED DESCRIPTION

By "inhibiting metal sulfate scale formation" we mean that scale is prevented from fouling or depositing on the surfaces of the aqueous system. For example, two possible mechanisms in which metal sulfates can be prevented from fouling or depositing on a surface are through 1) inhibiting the precipitation or crystallization of the metal sulfates from the water and 2) dispersing the metal sulfates once they have formed in the water to prevent them from attaching to surfaces. These mechanisms are presented as theory and are in no way meant to limit the present invention.

We have discovered scale inhibitors useful in inhibiting the formation of metal sulfates comprising one or more inorganic phosphates and one or more poly(amino acids). The inorganic phosphates may be added to the aqueous system together with the poly(amino acids), or added separately to the aqueous system. If added separately, the inorganic phosphates may be added before or after adding the poly(amino acids), or may be added simultaneously with the poly(amino acids). Preferably, the inorganic phosphates are added together with the poly(amino acids).

The total concentration of the one or more inorganic phosphates added with the poly(amino acids) to the aqueous system is typically the minimum amount needed to inhibit metal sulfate scale formation. Typically, the concentration of the inorganic phosphates is at least 0.1 mg/l, more preferably 0.5 to 100 mg/l, and most preferably 1 to 20 mg/l.

The total concentration of the poly(amino acids) added with the inorganic phosphates to the aqueous system to be treated is an effective amount to inhibit metal sulfate scale formation. Typically, the total concentration of poly(amino acids) is greater than 0.1 mg/l, preferably from 1 to 1000 mg/l, and most preferably from 3 to 600 mg/l.

Inorganic phosphates which have been found to inhibit metal sulfate scale formation with poly(amino acids) in aqueous systems include water soluble and molecularly dehydrated phosphates. By "molecularly dehydrated phosphate", we mean phosphates derived from monobasic orthophosphate, dibasic orthophosphate, or from orthophosphoric acid. The inorganic phosphates may be for example an alkali metal or alkaline earth metal orthophosphate, pyrophosphate, metaphosphate such has hexametaphosphate, tripolyphosphate, polyphosphate, and combinations thereof. The inorganic phosphates include for example sodium pyrophosphate, sodium hexametaphosphate, sodium polyphosphate, potassium pyrophosphate, potassium hexametaphosphate, or potassium polyphosphate. Preferably, the inorganic phosphates are alkali metal or alkaline earth metal orthophosphates, pyrophosphates, hexametaphosphates, or combinations thereof; and most preferably alkali metal or alkaline earth metal of pyrophosphates.

The poly(amino acids) useful for inhibiting metal sulfate scale formation contain amide or peptide bonds as shown below in Formula I.

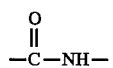

Formula I

The peptide linkages are typically formed from the reaction of compounds which contain a carboxylic acid group and an amino or ammonium group. For example, the poly(amino acids) may be formed from the reaction of one or more compounds selected from amino acids, amic acids, ammonium salts of monoethylenically unsaturated dicarboxylic acids, ammonium salts of hydroxypolycarboxylic acids, or combinations thereof. Optionally, additional monomers may be reacted with the compounds used to form the poly(amino acids).

The term "poly(amino acids)," is meant to include hydrolyzed and non-hydrolyzed poly(amino acids). "Hydrolyzed polyamino acids" are anhydropolyamino acids which have been reacted or hydrolyzed with at least one common base or acid.

The term "poly(amino acids)" as herein defined is also meant to include homopolymers of amino acids and copolymers of amino acids.

By "homopolymers of amino acids" we mean that the poly(amino acids) have only one type of repeating unit, where the repeating unit is derived from the reaction of at least one compound. For example, a homopolymer of aspartic acid, poly(aspartic acid), may be formed from the reaction of either aspartic acid, maleamic acid, ammonium salts of maleic acid, or ammonium salts of malic acid. Poly(aspartic acid), for example, may also be formed from the reaction of aspartic acid and maleamic acid, or aspartic acid and ammonium salts of maleic acid.

By "copolymers of amino acids" we mean that the poly(amino acids) contain at least two different types of repeating units where the repeating units are derived from the reaction of at least two different compounds. This definition of copolymer includes copolymers of two amino acids, provided that the repeating units formed when the two amino acids are reacted are not the same. For example, a copolymer of aspartic acid and histidine may be formed from the reaction of aspartic acid and histidine. However, a copolymer is not formed when the at least two different compounds reacted produce the same repeating unit. For example, when maleamic acid and aspartic acid are thermally condensed, the poly(amino acid) formed is a homopolymer of aspartic acid.

The poly(amino acids) may also be random, sequential, or block polymers. By "sequential" we mean the repeating units are alternated in a pattern within the polymer. By "block" we mean that the same type of repeating units are connected adjacently together in groups within the polymer.

The poly(amino acids) are synthesized by techniques well known to those skilled in the art. For example, they may be synthesized by naturally occurring biochemical processes or by synthetic chemical processes. Suitable processes, for example, are disclosed in "The Peptide Bond" in The Peptides: Analysis, Synthesis, Biology, edited by E. Gross and J. Meienhofer, published by Academic Press, NY, Vol 1, pages 1–64 (1979). A preferred method for synthesizing the poly(amino acids) is disclosed in U.S. Pat. No. 5,319,145. U.S. Pat. No. 5,319,145 discloses a condensation reaction method for preparing poly(amino acids). The process utilizes heat and mild agitation to condense and polymerize the amino acids, amic acids, ammonium salts of monoethylenically unsaturated dicarboxylic acids, and optional additional monomers.

The condensation reaction typically proceeds by polymerizing these compounds to form an anhydropoly(amino acid) by driving off the water formed from intermolecular condensation of these compounds as well as from internal cyclization. Water liberated is removed during the reaction to drive the reaction toward completion.

The condensation reaction may also be conducted in the presence of an acid catalyst such as for example, orthophosphoric acid and polyphosphoric acid. When an acid catalyst is used, the acid catalyst is typically added to the compounds to form a reaction mixture, and the reaction mixture is heated and agitated to form the anhydropoly(amino acid).

The anhydropoly(amino acid) which results from the condensation may be further reacted to form a hydrolyzed poly(amino acid). The hydrolysis reaction is conducted according to techniques well known to those skilled in the art such as with at least one common base or at least one common acid to form the corresponding water soluble salt or acid of the poly(amino acid). Preferably, the hydrolysis may be completely or partially carried out with any common alkali metal base, alkaline earth metal base, ammonium hydroxide, or low quaternary salt hydroxide, or combinations thereof to form the corresponding water soluble salt.

The weight average molecular weight (Mw), of the poly (amino acids) may be from 1000 to 100,000, preferably 2000 to 30,000, most preferably 3000 to 20,000 as determined by aqueous gel permeation chromatography (GPC) using as a standard 4500 Mw poly(acrylic acid).

Amino acids, which may be reacted to form the poly (amino acids) include for example, glycine, alanine, valine, leucine, isoleucine, phenylalanine, tyrosine, tryptophan, serine, threonine, aspartic acid, glutamic acid, asparagine, glutamine, lysine, arginine, histidine, methionine, cystine, cysteine, proline, hydroxyproline, β-alanine, phosphoserine, hydroxylysine, ornithine, citrulline, homocysteine, cystathionine, 4-aminobutyric acid, or combinations thereof. Preferably, the poly(amino acid) is formed from the reaction of at least one amino acid selected from glycine, alanine, leucine, phenylalanine, tyrosine, tryptophan, aspartic acid, glutamic acid, lysine, arginine, histidine, serine, β-alanine, 4-aminobutyric acid, or combinations thereof. More preferably, the poly(amino acid) is formed from the reaction of at least one amino acid selected from aspartic acid, lysine, arginine, histidine, 4-aminobutyric acid, phenylalanine, or combinations thereof.

Amic acids which may be reacted to form the poly(amino acids) are the monoamides of monoethylenically unsaturated dicarboxylic acids. Suitable amic acids include for example the monoamides derived from ammonia or primary amines, and the acid anhydride, ester or acyl halide of monoethylenically unsaturated dicarboxylic acids. Preferably, the amic acids are maleamic acid (the monoamide of maleic acid), methylenesuccinamic acid (the monoamide of itaconic acid), methylene glutaramic acid or the monoamides of mesaconic acid, methylenemalonic acid, fumaric acid, citraconic acid, aconitic acid, alkylmaleic acids, alkenylsuccinic acids, or combinations thereof. The most preferred amic acids are maleamic acid, methylenesuccinamic acid, or combinations thereof.

Ammonium salts of monoethylenically unsaturated dicarboxylic acids which may be reacted to form the poly(amino acids) are the partial or complete ammonium salts of monoethylenically unsaturated dicarboxylic acids. Suitable ammonium salts of monoethylenically unsaturated dicarboxylic acids include the partial or complete ammonium salts of maleic acid, itaconic acid, mesaconic acid, methylenemalonic acid, fumaric acid, citraconic acid, aconitic acid, alkylmaleic acids, alkenylsuccinic acids or combinations thereof. The preferred ammonium salts of monoethylenically unsaturated dicarboxylic acids are the ammonium salts of maleic acid.

Ammonium salts of hydroxypolycarboxylic acids which may be reacted to form the poly(amino acids) are the partial or complete ammonium salts of hydroxypolycarboxylic acids having at least one hydroxy group and two or more carboxylic acid groups. Suitable ammonium salts of hydroxypolycarboxylic acids include for example the ammonium salts of citric acid, isocitric acid, mucic acid, tartaric acid, or malic acid. Preferred ammonium salts of hydroxypolycarboxylic acids are the ammonium salts of citric acid or Optional additional monomers may be reacted with the compounds used to form the poly(amino acids). Optional monomers include for example carboxylic acids, hydroxycarboxylic acids, alcohols, alkoxylated alcohols, amines, alkoxylated amines, lactones, or lactams, or combinations thereof.

Carboxylic acids useful as optional additional monomers have at least one carboxylic acid group and may be saturated or ethylenically unsaturated. Suitable carboxylic acids include for example formic acid, acetic acid, propionic acid, butyric acid, valeric acid, lauric acid, palmitic acid, stearic acid, behenic acid, oleic acid, capric acid, linoleic acid, linolenic acid, sorbic acid, myristic acid, undecanoic acid, naturally occuring fatty acid mixtures such as for example $C_{12}$ to $C_{14}$ or $C_{16}$ to $C_{18}$ fatty acid mixtures, acrylic acid, or methacrylic acid or combinations thereof. Additional suitable carboxylic acids are carboxylic acids having more than one carboxylic acid group such as oxalic acid, adipic acid, fumaric acid, maleic acid, itaconic acid, aconitic acid, succinic acid, malonic acid, suberic acid, azelaic acid, furan dicarboxylic acid, phthalic acid, terephthalic acid, diglycolic acid, glutaric acid, 1,2,3-propanetricarboxylic acid, 1,1,3,3-propanetetracarboxylic acid, 1,3,3,5-pentanetetracarboxylic acid, 1,1,2,2-ethanetetracarboxylic acid, or 1,2,3,4-butanetetracarboxylic acid or combinations thereof. Anhydrides of carboxylic acids may also be used such as for example succinic anhydride, dianhydride of butanetetracarboxylic acid, phthalic anhydride, acetylcitric anhydride, maleic anhydride, itaconic anhydride, or aconitic anhydride.

The hydroxycarboxylic acids have at least one hydroxy group and at least one carboxylic acid group. Suitable hydroxycarboxylic acids include for example citric acid, isocitric acid, mucic acid, tartaric acid, hydroxymalonic acid, lactic acid, or malic acid. Additional hydroxycarboxylic acids include for example glyceric acid, bis (hydroxymethyl)propionic acid, or gluconic acid.

Alcohols useful as optional additional monomers are monohydric alcohols or polyols. Monohydric alcohols include for example methanol, ethanol, n-propanol, isopropanol, butanol, pentanol, hexanol, cyclohexanol, octanol, decanol, palmityl alcohol, or stearyl alcohol. Polyols include for example ethylene glycol, glycerol, oligoglycerol, erythritol, pentaerythrital, sorbital, triethanolamine, polysaccharide, or polyvinyl alcohol.

The alcohols may also be added to $C_2$ to $C_4$ alkylene oxides to form alkoxylated monohydric alcohols or polyols. For example alkoxylated polyols such as poly(ethylene glycol), poly(propylene glycol), or ethoxylated glycerol may be used as optional monomers.

Amines may also optionally be reacted. Amines include monoamines or polyamines. Suitable monoamines include for example $C_1$–$C_{22}$ alkyl or aryl amines such as methylamine, ethylamine, butylamine, diethylamine, cyclohexylamine, octylamine, stearyl amine, oleyl amine and palmitylamine, hydroxylamines such as N-(carboxymethyl)-hydroxylamine, N,N-di(carboxymethyl)hydroxylamine, tricarboxymethylhydroxylamine, ethanolamine, or diethanolamine. Polyamines include for example ethylenediamine, diethylenetriamine, triethylenetetraamine, hexamethylenediamine, diaminobutane, histamine, or polyvinylamine. The amines may also be added to $C_2$ to $C_4$ alkylene oxides to form alkoxylated amines.

As stated previously, the poly(amino acids) added with the inorganic phosphates to the aqueous system include copolymers of amino acids and homopolymers of amino acids. Preferably the poly(amino acids) added to the aqueous system are homopolymers.

Preferred homopolymers of amino acids useful in the present invention are a reaction product of at least one compound selected from aspartic acid, glutamic acid, lysine, arginine, histidine, alanine, β-alanine, 4-aminobutyric acid, maleamic acid, ammonium salts of maleic acid, or ammonium salts of malic acid. More preferably the homopolymers are a reaction product of at least one compound selected from aspartic acid, glutamic acid, lysine, maleamic acid, or the ammonium salts of maleic acid.

Preferred copolymers of amino acids useful in the present invention are a reaction product of at least one first amino acid and at least one second amino acid. The preferred copolymers of amino acids have a molar ratio of the first amino acid to the second amino acid of from 1:99 to 99:1; preferably from 40:60 to 95:5; and more preferably from 70:30 to 95:5.

The first amino acid of the preferred copolymer is preferably selected from aspartic acid and glutamic acid. More preferably the first amino acid is aspartic acid.

The second amino acid of the preferred copolymer is preferably selected from the group consisting of glycine, alanine, valine, leucine, isoleucine, phenylalanine, tyrosine, tryptophan, serine, threonine, asparagine, glutamine, lysine, arginine, histidine, methionine, cystine, cysteine, proline, hydroxyproline, β-alanine, phosphoserine, hydroxylysine, ornithine, citrulline, homocysteine, cystathionine, and 4-aminobutyric acid, or combinations thereof. More preferably, the second amino acid is selected from glycine, alanine, leucine, threonine, isoleucine, phenylalanine, lysine, arginine, histidine, tyrosine, serine, threonine, or combinations thereof, and most preferably, selected from lysine, arginine, histidine, or combinations thereof.

In another embodiment of the present invention, we have discovered that certain preferred poly(amino acids) are surprisingly effective in inhibiting the formation metal sulfates in an aqueous system, with or without inorganic phosphates being present in the aqueous system.

The certain preferred poly(amino acids) contain at least a first compound selected from tyrosine, tryptophan, histidine or arginine. Preferably the first compound is histidine.

The certain preferred poly(amino acids) may also contain one or more second compounds selected from amino acids, amic acids, ammonium salts of monoethylenically unsaturated dicarboxylic acids, ammonium salts of hydroxypolycarboxylic acids, or optional additional monomers. Preferably the one or more second compounds are selected from aspartic acid, glutamic acid, lysine, glycine, alanine, leucine, phenylalanine, serine, β-alanine, 4-aminobutyric acid, maleamic acid, ammonium salts of maleic acid, or ammonium salts of malic acid, or combinations thereof; more preferably selected from aspartic acid, glutamic acid, or lysine; and most preferably is aspartic acid.

The certain preferred poly(amino acids) contain from 1 to 100 mole percent; preferably 1 to 60 mole percent; and most preferably from 5 to 25 mole percent of the first compound. The certain preferred poly(amino acids) contain from 0 to 99 mole percent; preferably from 40 to 99 mole percent; and most preferably from 75 to 95 mole percent of the one or more second compounds.

These certain preferred poly(amino acids) may be synthesized as described previously for the poly(amino acids).

The total concentration of the certain preferred poly (amino acids) added to the aqueous system is that concentration needed to effectively inhibit the formation of metal sulfate scale. The concentration required generally depends upon the such variables as pH, temperature, or composition of the aqueous system to be treated. However, typically, the concentration may be greater than 0.1, preferably 1 to 5,000, and most preferably 3 to 1000 mg/l.

The scale inhibitors useful in the present invention are effective in inhibiting the scale formation of metal sulfates for example iron sulfate, manganese sulfate, and alkaline earth metal sulfates such as magnesium sulfate, calcium sulfate, barium sulfate, strontium sulfate, and radium sulfate. The scale inhibitor useful in the present invention is particularly effective in inhibiting the formation of calcium sulfate and barium sulfate.

The scale inhibitors are effective in inhibiting the formation of metal sulfate scale in the presence of other cations and anions. Cations which may be present in the aqueous system include for example alkali and alkaline earth metals. Anions which may be present in the aqueous system include for example carbonate, phosphate, molybdate, phosphonate, oxalate, and hydroxide ions. These cations and anions may combine to produce insoluble salts such as for example calcium carbonate, iron oxide, calcium phosphate, zinc hydroxide, iron molybdate, and calcium phosphonate.

The scale inhibitors useful in the present invention are more effective in inhibiting the formation of metal sulfate scale in aqueous systems having a pH from 2 to 14; preferably, from 3 to 9. Of particular importance are scale inhibitors useful in the present invention which are effective for inhibiting sulfate scale formation at pH's less than 7 where the metal sulfate is typically less water soluble.

The scale inhibitors are more effective in aqueous systems where the temperature is from 5° to 250° C.; preferably 15° to 95° C.

Other additives may be added to the aqueous system in addition to the scale inhibitors useful in the present invention. The other additives added will depend on the type of aqueous system. However, common other additives include, for example, one or more corrosion inhibitors, metal deactivators, additional scale inhibitors, threshold agents, and precipitating agents Corrosion inhibitors which may be added to the aqueous system include for example water soluble zinc salts, phosphates, polyphosphates, phosphonic acids, nitrates, molybdates, tungstates, silicates, ethanolamines, fatty amines, and poly(carboxylic acids).

Metal deactivators which may be added to the aqueous system include for example benzotriazole, or bis benzotriazole, derivatives of benzotriazole or tolyltriazole.

Additional scale inhibitors include poly(acrylic acid), phosphino-poly(carboxylic acids), hydrolyzed poly (acrylonitrile), poly(methacrylic acid), poly(maleic acid), poly(acrylamide), and copolymers of acrylic acid, methacrylic acid, acrylamide, acrylamide propionic sulfonic acid, acrylamido methylpropane sulfonic acid, alkyl acrylamide, styrene, and maleic acid.

Threshold agents which may be added to the aqueous system include, for example, 2 phosphonobutane-1,2,4-tricarboxylic acid, hydroxyethyl-diphosphonic acid, hydrolyzed poly(maleic anhydride), and hydroxyphosphonoacetic acid. Precipitating agents which may be added include alkali metal carbonates.

Other additives which may be added to the aqueous system include for example, oxygen scavengers, sequestering agents, antifoaming agents, and biocides.

An added advantage to the scale inhibitors useful in the present invention is that they may also be effective as corrosion inhibitors. Thus, the aqueous system treated with the scale inhibitors useful in the present invention may not need to be treated with a separate corrosion inhibitor.

The scale inhibitor useful in the present invention may also be effective in inhibiting the formation of other scales such as calcium carbonate, calcium phosphonate, iron oxide, and zinc phosphate, calcium phosphate.

The aqueous systems in which the scale inhibitors may be added are any aqueous system where the scale formation of metal sulfate have a deleterious effect on the performance of the aqueous system. Aqueous systems include for example cooling water systems, boilers, heat exchange equipment, reverse osmosis equipment, geothermal systems, oil and gas production operations, sugar production operations, flash evaporators, desalination plants, paper making equipment, and steam power plants. Preferably the aqueous system is for example reverse osmosis equipment, oil and gas production operations, desalination plants, and paper making equipment. The scale inhibitor may be added to various parts of the aqueous system where ever scale formation of sulfate is a problem.

Some embodiments of the invention will now be described in detail in the following Examples. In all examples where a weight average molecular weight (Mw) is reported, the Mw was measured by gel permeation chromatography using 4500 Mw poly(acrylic acid) as a standard. The abbreviations used in Tables 2–4 are defined in Table 5.

The scale inhibitors useful in the present invention were tested for their ability to inhibit barium sulfate scale formation in Examples 1–29. The test method used in Examples 1–29 for measuring inhibition of barium sulfate consisted of the following steps: 1) Preparation of test solutions containing the scale inhibitor, 2) Incubation of the test solutions, and 3) Measurement of barium which did not precipitate in the test solutions. Accordingly, in comparing two test solutions, the test solution having the higher percent barium sulfate inhibition, contains a scale inhibitor which is more effective in inhibiting metal sulfate scale formation.

The test solutions were prepared from a barium containing solution, a sulfate containing solution, a buffer solution, and an inhibitor solution containing the inhibitor. The composition of the barium and sulfate containing solutions were similar to the following solutions shown in Table 1:

TABLE 1

Composition of Barium and Sulfate Containing Solutions Similar to those Actually Used*

| Components | Concentration (mg/l) | |
|---|---|---|
| | Barium Solution | Sulfate Solution |
| KCl | 709 | 878 |
| NaCl | 74,202 | 23,953 |
| $CaCl_2$ | 7,778 | 1,186 |
| $MgCl_2$ | 1,974 | 5358 |
| $BaCl_2$ | 382 | 0 |
| $SrCl_2$ | 1,038 | 14 |
| $Na_2SO_4$ | 0 | 4,378 |
| $NaHCO_3$ | 683 | 171 |
| Deionized Water | balance | balance |

*The barium and sulfate containing solutions shown in Table 1, when combined with the buffer and inhibitor solutions according to the test method described herein to form an inhibitor test solution provide the same inhibitor test solution composition as was used in Examples 1–29.

The composition of the buffer and inhibitor solutions were as follows:

| Components | Concentration |
|---|---|
| Buffer Solution | |
| $CH_3COONa \cdot 3H_2O$ | 13.6 g/100 ml |
| $H_3CCOOH$ | 0.535 g/100 ml |
| Deionized Water | balance |
| Inhibitor Solution | |
| Scale inhibitor to be tested for $BaSO_4$ inhibition. | 1 g/l |
| Deionized Water | balance |

The barium and sulfate containing solutions were filtered through a 0.45 micron filter and adjusted to a pH of 6.0 with dilute HCl. The inhibitor solution was adjusted to a pH of 6 with dilute HCl or dilute NaOH.

The test solutions containing a scale inhibitor, hereinafter called the "inhibitor test solution" were prepared by combining 1 ml of the buffer solution, 50 ml of the sulfate containing solution, the desired amount of inhibitor solution, and 50 ml of the barium containing solution. In the Examples where the test solution contained a combination of an inorganic phosphate and polymer as the scale inhibitor, two inhibitor solutions were prepared: 1) a solution containing 1 gram per liter of inorganic phosphate, as $PO_4$, and 2) a solution containing 1 gram per liter of poly(amino acid), as polymer in the acid form. The two scale inhibitor solutions were then added to the test solution to produce the desired concentration of scale inhibitor.

As controls, a no inhibitor test solution, a sulfate test solution and a barium test solution were prepared. The no inhibitor test solution was prepared by combining 1 ml of the buffer solution, 50 ml of the sulfate containing solution, 50 ml of the barium containing solution, and deionized water in an amount equal to the amount inhibitor solution added to the inhibitor test solution. For example, if 2.4 ml of inhibitor solution (total) was added to the inhibitor test solution, 2.4 ml of deionized water was added to the no inhibitor test solution. The sulfate test solution was prepared by combining 1 ml of the buffer solution, 100 ml of the sulfate solution, and deionized water in an amount equal to the amount of inhibitor solution added to the inhibitor test solution. The barium test solution was prepared by combining 1 ml of the buffer solution, 100 ml of the barium containing solution, and deionized water in an amount equal to the amount of inhibitor solution added to the inhibitor test solution.

The inhibitor, no inhibitor, sulfate, and barium test solutions were placed in a water bath at 85° C. and gently shaken for 24 hours. After the 24 hour incubation period, the test solutions were removed one at a time from the water bath and a diluted test solution was prepared from each test solution for analyzing barium content. The diluted test solution was prepared by adding to a 100 ml flask the following ingredients in the order listed:

1) 5 ml of the EDTA Solution
2) 30 ml of deionized water
3) 5–10 g of supernatant taken from the incubated test solution
4) deionized water (balance to make 100 ml)

The EDTA Solution consisted of 100 grams per liter of $K_2EDTA \cdot 2H_2O$, and deionized water (balance). The pH of the EDTA Solution was adjusted to 10.5 with KOH pellets.

The diluted test solutions were measured for barium using direct current plasma on a Spectra Span 7 DCP Spectrometer manufactured by Applied Research Laboratories Fisons located in Valencia, Calif. The concentration of the barium in the undiluted test solutions was calculated from the measured values of barium. The percent barium sulfate inhibition was obtained from Formula II:

Percent BaSO₄ Inhibition =         (Formula II)

$$\frac{100 \times (\text{Ba Inhibitor} - \text{Ba No Inhibitor})}{0.5 \times (\text{Ba Barium} + \text{Ba Sulfate}) - \text{Ba No Inhibitor}}$$

where:

Ba Inhibitor=concentration of barium in inhibitor test solution

Ba No Inhibitor=concentration of barium in no inhibitor test solution

Ba Barium=concentration of barium in barium test solution

Ba Sulfate=concentration of barium in sulfate test solution

The scale inhibitors shown in Table 2 were tested for barium sulfate inhibition. Table 2 shows that homopolymers of amino acids added with inorganic phosphates in an aqueous system are more effective in inhibiting the formation metal sulfate scale than homopolymers of amino acids alone or inorganic phosphates alone.

Table 2 shows that when a homopolymer of aspartic acid (polyaspartic acid) is combined with orthophosphate, pyrophosphate or hexametaphosphate in a test solution (Examples 5–7, 10–11, 13–14, and 16–17) the polyaspartic acid and the inorganic phosphate inhibit the formation of barium sulfate more effectively than polyaspartic acid alone at a given Mw (Comparative Examples 4, 8, 12, and 15) or the phosphate alone (Comparative Examples 1–3). The improvement observed is particularly significant when polyaspartic acid is added with pyrophosphate to a test solution.

The polyaspartic acid in Examples 4–7 was prepared from the reaction of maleic anhydride and ammonia to form polysuccinimide. A 30 weight percent aqueous ammonia solution was used as a diluent in the reaction. The mole ratio of ammonia to the maleic anhydride used was 1.05 moles ammonia to 1 mole maleic anhydride. The diluent was used at a mole ratio of 0.13 moles ammonium hydroxide to 1 mole maleic anhydride. The polysuccinimide formed from the reaction was then hydrolyzed at an aqueous pH of 10.8 at 90° C. for 30 minutes with sodium hydroxide to form the poly(aspartic acid). In the preparation process the maleic anhydride and ammonia reacted to form an ammonium salt of maleic acid, which then condensed to form the polysuccinimide.

The polyaspartic acid in Examples 8–17 was prepared from the thermal condensation reaction of a mixture of aspartic acid and 85 weight percent orthophosphoric acid to form poly(succinimide). The mixture of the aspartic acid and the othophosphoric acid was varied to achieve the Mws reported in Table 2. The mixtures were the following:

Examples 8–11

97.5 weight percent aspartic acid, and 2.5 weight percent of the orthophosphoric acid Examples 12–14

90 weight percent aspartic acid, and 10 weight percent of the orthophosphoric acid Examples 15–17

80 weight percent aspartic acid, and 20 weight percent orthophosphoric acid

After the condensation reaction was complete in Examples 8–17, the orthophosphoric acid was washed from the polysuccinimide using water to completey remove the acid. The polysuccinimide in Examples 8–17 was then hydrolyzed at a pH of 10.8, at 90° C., for 30 minutes, using sodium hydroxide to form the poly(aspartic acid).

TABLE 2

Inhibition of Sulfate Scale Formation with Homopolymers of Amino Acids and Phosphates

| Example | Scale Inhibitor | Mw of Polymer[1] | Polymer Conc. (mg/l)[2] | Phosphate Conc. (mg/l)[3] | % BaSO4 Inhibition |
|---|---|---|---|---|---|
| 1 (comp.) | ORTHO | — | 0 | 4.8 | 1.1 |
| 1a (comp.) | ORTHO | — | 0 | 25 | 4.1 |
| 2 (comp) | PYRO | — | 0 | 4.8 | 0.0 |
| 2a (comp) | PYRO | — | 0 | 25 | 7.1 |
| 3 (comp) | SHMP | — | 0 | 4.8 | 3.5 |
| 3a (comp) | SHMP | — | 0 | 25 | 136.7 |
| 4 (comp) | PASP | 1930 | 24 | 0 | 3.8 |
| 5 | PASP/ORTHO | 1930 | 24 | 4.8 | 5.4 |
| 6 | PASP/PYRO | 1930 | 24 | 4.8 | 103.7 |
| 7 | PASP/SHMP | 1930 | 24 | 4.8 | 5.8 |
| 8 (comp) | PASP | 5330 | 24 | 0 | 8.8 |
| 9 | PASP/ORTHO | 5330 | 24 | 4.8 | 5.3 |
| 10 | PASP/PYRO | 5330 | 24 | 4.8 | 106 |
| 11 | PASP/SHMP | 5330 | 24 | 4.8 | 75.7 |
| 12 (comp) | PASP | 8000 | 24 | 0 | 13.0[4] |
| 13 | PASP/ORTHO | 8000 | 24 | 4.8 | 27.1 |
| 14 | PASP/PYRO | 8000 | 24 | 4.8 | 103.5[4] |
| 15 (comp) | PASP | 16,400 | 24 | 0 | 13.7[4] |
| 16 | PASP/ORTHO | 16,400 | 24 | 4.8 | 49.9 |
| 17 | PASP/PYRO | 16,400 | 24 | 4.8 | 107.4[4] |

[1] Mw of amino acid homopolymer
[2] Concentration of polymer, as polymer in acid form, in scale inhibitor test solution
[3] Concentration of phosphate, as PO₄, in scale inhibitor test solution
[4] Average of 2 data points Copolymers of amino acids with and without inorganic phosphates were tested for their ability to inhibit barium sulfate scale formation. The ability of copolymers of amino acids to inhibit barium sulfate with and without an inorganic phosphate is shown in Table 3.

Table 3 demonstrates that a combination of copolymers of amino acids and inorganic phosphates are more effective in inhibiting barium sulfate scale formation (Examples 19, 21, 23, 25) than using the copolymers or the inorganic phosphates alone.

Examples 18 and 20 in Table 3 show that a copolymer of aspartic acid and histidine (a basic amino acid) or a copolymer of aspartic acid and tyrosine (an aromatic amino acid) are particularly effective in inhibiting barium sulfate scale formation when compared to poly(aspartic acid) (Examples 4, 8, 12, and 15, Table 2) and other copolymers of amino acids (Comparative Examples 22, 24, 26, 27, 28). The copolymer of aspartic acid and histidine in Table 3 is the most effective for inhibiting barium sulfate scale formation in comparison to the other copolymers shown in Table 3.

The copolymers in Table 3 were prepared from the thermal condensation of amino acids. For each copolymer in Table 3 (Examples 18–28), the amino acids were thermally condensed in the proportions of 80 moles of the first amino acid shown in Table 3, under "Scale Inhibitor" (i.e., aspartic acid) to 20 moles of the second amino acid shown in Table 3 to form a reaction product. In Example 27, the proportions of amino acids condensed were 80 moles of aspartic acid to 20 moles of serine; however, a reaction product of aspartic acid, serine, and d-alanine formed in the proportions shown in Table 3. In Examples 18–28, the thermal condensation reaction was performed using an acid catalyst. Polyphosphoric acid was used in Examples 18–25 and 27°–28, and orthophosphoric acid was used in Example 26. After the reaction was complete, the acid catalyst was completely removed from the reaction product by washing with water. The reaction product was purified by dialysis, and then hydrolyzed at a pH of 10.8, with sodium hydroxide, at 90° C. over 30 minutes.

TABLE 3

Inhibition of Sulfate Scale with Copolymers of Amino Acids/ with and without Phosphates

| Example | Scale Inhibitor | Polymer Mw | Polymer Conc. (mg/l)[5] | Phosphate Conc. (mg/l)[6] | % BaSO4 Inhibition |
|---|---|---|---|---|---|
| 18 | 87.7 ASP/ 12.3 TYR | 4360 | 28.8 | 0 | 33.0 |
| 19 | 87.7 ASP/ 12.3 TYR | 4360 | 24.0 | 4.8 | 83.6 |
| 20 | 90.0 ASP/ 10.0 HISHCl | 3420 | 28.8 | 0 | 79.4 |
| 21 | 90.0 ASP/ 10.0 HISHCl | 3420 | 24.0 | 4.8 | 98.1 |
| 22 (comp) | 85.4 ASP/ 14.6 GLY | 5350 | 28.8 | 0 | 7.6 |
| 23 | 85.4 ASP/ 14.6 GLY | 5350 | 24.0 | 4.8 | 101 |
| 24 (comp) | 84.6 ASP/ 15.4 PHE | 3190 | 28.8 | 0 | 7.8 |
| 25 | 84.6 ASP/ 15.4 PHE | 3190 | 24.0 | 4.8 | 98.2 |
| 26 (comp) | 85.1 ASP/ 14.9 LYS | 5700 | 28.8 | 0 | 15.3 |
| 27 (comp) | 95.9 ASP/0.07 SER/4.02 d-ALA | 5660 | 28.8 | 0 | 19.8 |
| 28 (comp) | 87.1 ASP/ 12.9 LEU | 2980 | 28.8 | 0 | 10.1 |

[5]Concentration of polymer, as polymer in acid form, in scale inhibitor test solution
[6]Phosphate tested was sodium pyrophosphate, concentration shown is as PO₄

A combination of poly(aspartic acid) of molecular weight 7970 (made by the same procedure as in Examples 12–14) and sodium pyrophosphate was tested at various concentrations for inhibition of barium sulfate scale formation. The results are shown in Table 4. Comparative Example 31 and Example 32 demonstrate that a scale inhibitor of 0.5 mg/l pyrophosphate and 5 mg/l of poly(aspartic acid) is more effective in inhibiting barium sulfate scale formation than 5 mg/l of poly(aspartic acid) alone. The percent improvement between Examples 31 and 32 is 129% based on Example 31. Example 33, demonstrates that a scale inhibitor of poly (aspartic acid), dosed at a concentration of 1 mg/l, and pyrophosphate, dosed at a concentration of 10 mg/l, is more effective than pyrophosphate alone dosed at 25 ppm (Example 2a) and poly(aspartic acid) dosed at 5 mg/l (Comparative Example 31).

TABLE 4

Effect of Polymer and Phosphate Concentration on Sulfate Inhibition Scale

| Example | Polymer[7] Concentration (mg/l) | Phosphate[8] Concentration (as PO4, mg/l) | % BaSO4 Inhibition |
|---|---|---|---|
| 12 (comp) | 24 | 0 | 13.0 |
| 30[9] | 24 | 4.76 | 103.5 |
| 31[9] (comp) | 5 | 0 | −7.4 |
| 32[9] | 5 | 0.5 | 2.2 |
| 2a (comp) | 0 | 25 | 7.1 |
| 33[9] | 1 | 10 | 102.4 |

[7]Polymer tested in Examples 30–33 was poly(aspartic acid) having a Mw of 7970.
[8]Phosphate tested was sodium pyrophosphate
[9]The Barium Solution added to the test solution for Examples 30, 32, and 33 was diluted to reduce the concentration of the components in the barium containing solution in half.

TABLE 5

Abbreviations Used in Tables 2-4

| Abbreviation | Definition |
|---|---|
| comp | comparative |
| ORTHO | orthophosphoric acid |
| PYRO | sodium pyrophosphate |
| SHMP | sodium hexametaphosphate |
| PASP | poly(aspartic acid) |
| ASP | mole percent aspartic acid |
| TYR | mole percent tyrosine |
| HISHCl | mole percent histidine hydrochloride |
| GLY | mole percent glycine |
| PHE | mole percent phenylalanine |
| LYS | mole percent lysine |
| SER | mole percent serine |
| d-ALA | mole percent d-alanine |
| LEU | mole percent leucine |

We claim:

1. A method of inhibiting scale formation, comprising: adding to an aqueous system an effective amount of one or more poly(amino acids) and from 0.5 to 100 milligrams per liter of one or more inorganic phosphates; wherein the poly(amino acids) comprise a reaction product of at least one compound selected from the group consisting of: glycine, alanine, valine, leucine, isoleucine, phenylalanine, tyrosine, tryptophan, serine, threonine, aspartic acid, glutamic acid, asparagine, glutamine, lysine, arginine, histidine, β-alanine, phosphoserine, hydroxylysine, 4-aminobutyric acid, maleamic acid, ammonium salts of maleic acid, and ammonium salts of malic acid, and combinations thereof; and wherein the scale is metal sulfate scale.

2. The method of claim 1, wherein the reaction product further comprises one or more optional additional monomers selected from the group consisting of carboxylic acids, hydroxycarboxylic acids, alcohols, alkoxylated alcohols, amines, alkoxylated amines, lactones, lactams, and combinations thereof.

3. The method of claim 1, wherein: the poly(amino acids) are copolymers of amino acids.

4. The method of claim 3, wherein: the copolymers of amino acids comprise a reaction product of at least two different compounds independently selected from the group consisting of glycine, alanine, valine, leucine, isoleucine, phenylalanine, tyrosine, tryptophan, serine, threonine, aspartic acid, glutamic acid, asparagine, glutamine, lysine, arginine, histidine, β-alanine, 4-aminobutyric acid, maleamic acid, ammonium salts of maleic acid, and ammonium salts of malic acid, and combinations thereof and wherein the copolymers contain at least two different types of repeating units.

5. The method of claim 1, wherein: the poly(amino acids) are homopolymers of amino acids.

6. The method of claim 5, wherein: the homopolymers of amino acids comprise a reaction product of at least one compound selected from the group consisting of: aspartic acid, glutamic acid, asparagine, glutamine, maleamic acid, ammonium salts of maleic acid, and ammonium salts of malic acid.

7. The method of claim 5, wherein: the homopolymers of amino acids are poly(aspartic acid).

8. The method of claim 1, wherein: the inorganic phosphates are pyrophosphates.

9. The method of claim 1, wherein: the poly(amino acids) comprise a reaction product of at least one compound selected from the group consisting of: glycine, alanine, valine, leucine, isoleucine, phenylalanine, tyrosine, tryptophan, serine, threonine, aspartic acid, glutamic acid, asparagine, glutamine, lysine, arginine, histidine, β-alanine, 4-aminobutyric acid, maleamic acid, ammonium salts of maleic acid, and ammonium salts of malic acid, and combinations thereof.

10. The method of claim 1, wherein the poly(amino acids) are added to the aqueous system at a concentration of greater than 0.1 milligrams per liter.

11. A method of inhibiting scale formation, comprising: adding to an aqueous system an effective amount of one or more poly(amino acids), wherein the poly(amino acids) comprise a reaction product of from 1 to 60 mole percent of at least one first compound selected from the group consisting of histidine, arginine, tyrosine, tryptophan, and combinations thereof and one or more second compounds selected from the group consisting of: aspartic acid, glutamic acid, asparagine, glutamine, maleamic acid, ammonium salts of maleic acid, ammonium salts of malic acid, and combinations thereof; and wherein the scale is metal sulfate scale.

12. The method of claim 11, wherein the first compound is histidine.

13. The method of claim 11, wherein the poly(amino acids) are copolymers of aspartic acid and histidine.

14. The method of claim 11, wherein: the one or more poly(amino acids) are added to the aqueous system at a concentration of from 1 milligram per liter to 5000 milligrams per liter.

* * * * *